(12) United States Patent
Chan et al.

(10) Patent No.: US 7,734,628 B2
(45) Date of Patent: Jun. 8, 2010

(54) METHOD AND APPARATUS FOR DISPLAYING AND INTERACTING WITH HIERARCHICAL INFORMATION AND TIME VARYING RULE PRIORITY

(75) Inventors: Hoi Yeung Chan, Stamford, CT (US); Sharon L Greene, Mount Kisco, NY (US); Charles Albert Kerr, Endicott, NY (US); Paul Michael Matchen, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/167,769

(22) Filed: Jul. 3, 2008

(65) Prior Publication Data

US 2008/0262983 A1   Oct. 23, 2008

Related U.S. Application Data

(63) Continuation of application No. 11/067,791, filed on Feb. 28, 2005.

(51) Int. Cl.
   *G06F 17/30* (2006.01)
(52) U.S. Cl. ........................ 707/737; 707/694
(58) Field of Classification Search .............. 707/101, 707/102
   See application file for complete search history.

(56) References Cited

U.S. PATENT DOCUMENTS

| | | | |
|---|---|---|---|
| 2003/0200533 A1* | 10/2003 | Roberts et al. | 717/124 |
| 2006/0031340 A1* | 2/2006 | Mathew et al. | 709/206 |
| 2007/0174041 A1* | 7/2007 | Yeske | 704/3 |
| 2008/0306746 A1* | 12/2008 | Racca et al. | 705/1 |

FOREIGN PATENT DOCUMENTS

EP   0999505   * 5/2000

OTHER PUBLICATIONS

Mitra et al., "A Graph-Oriented Model for Articulation of Ontology Interdependencies", Book Series Lecture Notes in Computer Science, vol. 1777, P-86-100, Jan. 1, 2000. Retrieved from the Internet: <URL: http://www.springerlink.com/content/mdebqfhphhtk51l1/fulltext.pdf>.*

May, Golfgang et al., "Understanding the Global Semantics of Referential Actions Using Logic Rules", ACM Transactions on Database Systems, vol. 27, No. 4, p. 343-397, Dec. 2002. Retrieved from Internet: <URL: http://portal.acm.org /ft_gateway.cfm?id=582411&type=pdf&coll=ACM&dl=ACM&CFID=30809306&CFTOKEN=43342998>.*

(Continued)

*Primary Examiner*—Jean B. Fleurantin
*Assistant Examiner*—Dennis Myint
(74) *Attorney, Agent, or Firm*—George Willinghan; August Law, LLC

(57) ABSTRACT

A graphical interaction and authoring system is provided that combines textual and graphical information to display hierarchical information via an interactive visual mechanism for the composition and manipulation of syntactic structures, enabling business users to view, operate, and compose information in a way that not only graphically preserves the structure of the syntax, but also maintains the relationship of the expression. The system provides a way for the users to interact with it dynamically and effectively.

28 Claims, 5 Drawing Sheets

OTHER PUBLICATIONS

Jeff O. Kephart, David M. Chess, "The Vision of Autonomic Computing", Computer Journal, IEEE Computer Society, Jan. 2003 issue.

Rete: "A Fast Algoritm for the Many Pattern/Many Object Pattern Match Problem", Charles L. Forgy, Artificial Intelligence 19(1982), pp. 17-37.

Business Rules-http://www.agilemodeling.com/artifiacts/businessRule.htm.

Production Rule Priority-http://citeseer.ist.psu.edu/agrawal91maintaining.html.

Curve Fitting Functions-http://www.mathpad.com/public/htmls/main/left/fit/CurveFitInfo.html.

Programming Languages for the JAVA Virtual Machine: http://www.robert-tolksdorf.de/vmlanguages.html (2005).

* cited by examiner

METHOD AND APPARATUS FOR DISPLAYING AND INTERACTING WITH HIERARCHICAL INFORMATION AND TIME VARYING RULE PRIORITY

CROSS-REFERENCE TO RELATED APPLICATIONS

The present application is a continuation of co-pending U.S. application Ser. No. 11/067,791, filed Feb. 28, 2005. The entire disclosure of that application is incorporated herein by reference.

FIELD OF THE INVENTION

The present invention relates to systems and methods for authoring and modifying rule sets containing rules and associated priorities.

BACKGROUND OF THE INVENTION

The use of business rules and policies to externalize business and operational logic from an application is an important concept and approach to building large business applications and to new areas such as self-managing systems or autonomic computing systems. Business rules and policies are statements that are intended to be readable and modifiable by non-technical users and executable by an underlying mechanism such as a rule engine or a Java Virtual Machine (JVM), allowing application logic to be authored and modified external to the application.

One of the key aspects of using these business rules or policies is the ability to specify a priority for each of the rules in a set of business rules. A business rule set is a collection of rules selected and arranged to achieve a desired goal. Assigning a priority to each rule contained in the rule set controls the sequence of execution of rules in the rule set. Typically, priorities are initially established and assigned by a rule author; however, priority of the rules can be subsequently modified in accordance with application specific parameters, i.e. different situations and execution environments.

In a basic method of specifying the priority of each rule in a rule set, the rule author attaches a number, for example an integer value, to each rule that indicates the priority of that rule relative to the other rules in the rule set. The relationship between the attached number and the priority can be inverse such that the higher the number the lower the priority, or proportional such that the lower the number the lower the priority.

Priorities have been assigned to rules that are triggered based upon the occurrence of specified events or the value of specified parameters. Since the occurrence of a single event can trigger more than one rule, priorities are established among the rules to determine which of the rules are applied first. Therefore, even if multiple rules are triggered based upon the occurrence of an event, only the triggered rule with the highest established priority will be applied. For example, a first rule in a rule set, assigned a priority value of 2, offers a discount of 10% to customers that spend more then $100.00. The second rule, assigned a priority value of 1, offers a discount of 20% if the customer buys at least 10 items, and a third rule, assigned a priority value of 3, offers a discount of 25% if the customer buys at least 10 items in the month of December. The priority values indicate that the second rule is applied first followed by the first rule and then the third rule.

Priority has also been provided by arranging the rules in an ordered list by the desired order of execution. For example, a first rule offers a discount of 10% if the customer spends more than $100.00, and a second rule offers a discount of 20% if the customer buys at least 10 items. A third rule offers a discount of 25% during the month of December if the customer buys at 10 least items. Using this approach, the rule author is specifying that rule 1 is always executed first followed by rule 2 and then rule 3.

In addition to priority, additional constraints have been applied to each rule. The rule author can prescribe time periods for the enabling or disabling of the execution of a given rule. For example, the first rule wherein the customer is offered a 10% discount for spending more than $100.00 is scheduled to begin on January $1^{st}$ and end on June $30^{th}$. The second rule wherein the customer is offered a discount of 10% for purchasing at least 10 items is scheduled to begin on July $1^{st}$ and end on December $31^{st}$. The third rule wherein the customer is offered a discount of 25% for purchasing at least 10 items in the month of December is scheduled to begin on November $15^{th}$ and to end on December $26^{th}$. Each of these three rules will only be executed on dates occurring within the prescribed time periods.

In addition to specifying time periods during which a given rule is either applied or not applied, it is often desired to vary the priority of a given rule relative to the other rules. For example, the third rule is given priority over the second rule during the holiday season, and, conversely, the second rule is given priority over the third rule at all other times of the year. Variable priority is achieved in the rule set of the proceeding paragraph, for example, by assigning a priority value of 2 to the first and second rules and a priority value of 1 to the third rule. However, the priority values assigned to the rules themselves are fixed, and do not vary over time.

Conventional rule ordering and priority systems express simple interrelationships among the rules in the rule set and fail to address the need to specify the varying of the priority value assigned to a rule using more complex functions. In particular, current rule authoring systems do not enable the application of time dependent priorities. As was illustrated in the proceeding paragraph, current rule authoring systems require a new or separate version of the rule for each time period and for each priority.

In addition to creating and expressing priorities among the plurality of rules in a given rule set, authoring systems attempt to provide for the manipulation of data. Data manipulation is used to model real-world or actual situations and variables that business users encounter. Traditionally, authoring and data manipulation systems were created by programmers for use by other programmers. Therefore, the interfaces are not business-user friendly, providing a format that is not natural, intuitive or easily understandable to a typical business user.

The intended progression of business rules expressed in more natural, non-formal language can be ambiguous or open to more than one interpretation. For example, the instruction to please hand someone the bat and the ball or the glove can be interpreted in at least two ways. This instruction can be interpreted to state that the person is to be handed the bat and ball or the bat and glove. Alternatively, the instruction can be interpreted to state that the person is to be handed the bat and the ball or just the glove. Additional information is needed to clarify how this instruction is to be interpreted.

Additional conjunctions, for example the conjunctions either or both, can be used to provide this additional information and to eliminate any ambiguity in the instruction. For example, the instruction can be reworded as the instruction to give someone the bat and either the ball or the glove. Alternatively, the instruction can be written as please give someone both the bat and the ball or the glove. However, even though the word both is utilized in the instruction, the instruction is still susceptible to two different interpretations.

Ambiguities can also be resolved through the use of generally accepted and widely applied precedence rules that convey the intended meaning unambiguously. An example of such precedence rules is found in the construction of algebraic expressions that use operator precedence to assign unambiguous meaning to a given expression. As long as the author and the reader are familiar with the established precedence, the meaning of a given algebraic expression is clearly conveyed. For example, the expression $x=3+4\times5$ is understood to imply that 4 is multiplied by 5 followed by the addition of 3 since multiplication and division are performed first followed by addition and subtraction. Parentheses, however, are used to override the priority of multiplication and division. Thus, $x=(3+2)\times5$ is interpreted to state that 3 and 2 are added together first and the resultant sum is multiplied by 5. Although universally accepted precedence is available when constructing algebraic expressions, similar precedence is not available when providing written directions or instructions as, for example, when constructing business rules.

Therefore, a need exists for a rule authoring system that provides for authoring of variable priorities for business rules and for the active and direct modification of the priorities by the author. Systems and structures are needed to communicate a desired hierarchy for written instructions or logical rules. Author interfaces are needed that are clear, concise and as consistent as possible with the thought processes of the business user. In addition, the tools that the business users are provided to interact with and manipulate the data are intuitive and understandable by the business user.

SUMMARY OF THE INVENTION

The present invention is directed to systems and methods that utilize a graphical approach to display and interact with hierarchical information in a way that is conceptually natural for business users to compose business rules or business policies. Authoring systems in accordance with exemplary embodiments of the present invention contain reusable blocks of pre-defined expressions within a graphical environment that facilitates the combining of these reusable blocks together graphically to form complex expressions of the business rules or business policies. These systems also contain additional mechanisms to assist in the construction of the complex expressions including using color-keyed, nested boxes to provide integrity of the composed expression, to minimize possible errors and to reduce the dependency on run-time error checking. The result is a business rule authoring system that provides substantial savings in the cost of tool design and potential run time errors.

In addition, the present invention facilitates the application of time varying rule priorities within a rule set using a graphical user interface (GUI) mechanism that facilitates the definition and application of multi-dimensional and multi-variant rule priorities through direct manipulation of a function curve. The function curve illustrates the fluctuation of priority with respect to any variable. In one embodiment, a function curve can be applied that varies the priority of a given rule based upon customer income. For example, the relative value of the priority of a cross-sell rule for an expensive item varies with the income level associated with the customer. In another embodiment, a function curve is applied that varies the priority of a given rule over time.

In accordance with exemplary aspects of the present invention, an interactive graphical user interface (GUI) enables users to visualize, to create and to modify business rules in an easy and intuitive manner that generally mirrors the human thought process. The GUI includes a direct manipulation interface that allows users to specify and to visualize relationships in rule priorities over one or more variables, for example time. The GUI also provides for the automatic generation of rule priority functions based upon the graphically displayed and manipulated priorities. Therefore, systems and methods in accordance with exemplary aspects of the present invention provide for the displaying of, and interacting with, hierarchical information and for specifying changes in rule priority over time using a graphical representation such as a two-dimensional curve or nested boxes, which are sometimes referred to as Chinese boxes.

DETAILED DESCRIPTION

The use of prioritized business rules and policies to externalize business logic from an application is an important concept to building business applications for business users. An aspect of exemplary embodiments in accordance with the present invention is the ability to enable business users to visualize and to modify business rules in an easy to use and quick to understand graphical environment.

In one embodiment, a graphical user interface (GUI) mechanism is used to construct rule sets containing a plurality of rules, to associate priorities with these rules and to modify these priorities. Preferably, the rules are business rules that externalize business logic in applications. In general, business rules are statements intended to be readable and modifiable by non-technical business users and to be executable by an underlying mechanism. Examples of these underlying mechanisms include a RETE rule engine and a Java™ Virtual Machine (JVM). The interactive GUI mechanism facilitates the creation and manipulation of these rules by a business user independent of the underlying application.

Business rules are used in various applications to minimize cost, to simplify maintenance and to increase manageability. A typical business rule has a fixed and well-defined syntactic structure wherein if a particular condition is met then a pre-defined action is executed. In one embodiment, the condition contains up to two operands, a, b, c, etc., and an operator, for example less than, greater than, equal to, etc. The evaluation of these conditions is either true or false, e.g. a>b (a is greater than b) or a=c (a equals c). Each condition containing two operands and an operator can be linked to other conditions using logical connectives to form complex conditions, for example (a>b) and (f=g) or (m<u). The logical connectives in this example are "and" and "or".

In addition to being a single variable, each operand can represent a complex expression involving, for example, an arbitrary function or an arithmetic expression. An example of a complex operand is (((TempInCelcius/5)*9)+32)>70. As illustrated, the operand is represented as a string within nested parentheses, indicating the precedence of the enclosed operation. Alternatively, the operands and operators are illustrated using a tree structure instead of parentheses or nested boxes to indicate precedence. The string and parentheses representation system is straightforward for simple expressions. For more complex expressions that require frequent insertions or deletions of hierarchical information, the string representation is more limited both as a means of interacting with the expression and in providing feedback to the users regarding the result of the insertions and deletions. An interactive nested box system is a preferred representation system for more complex expressions.

Figure 1:
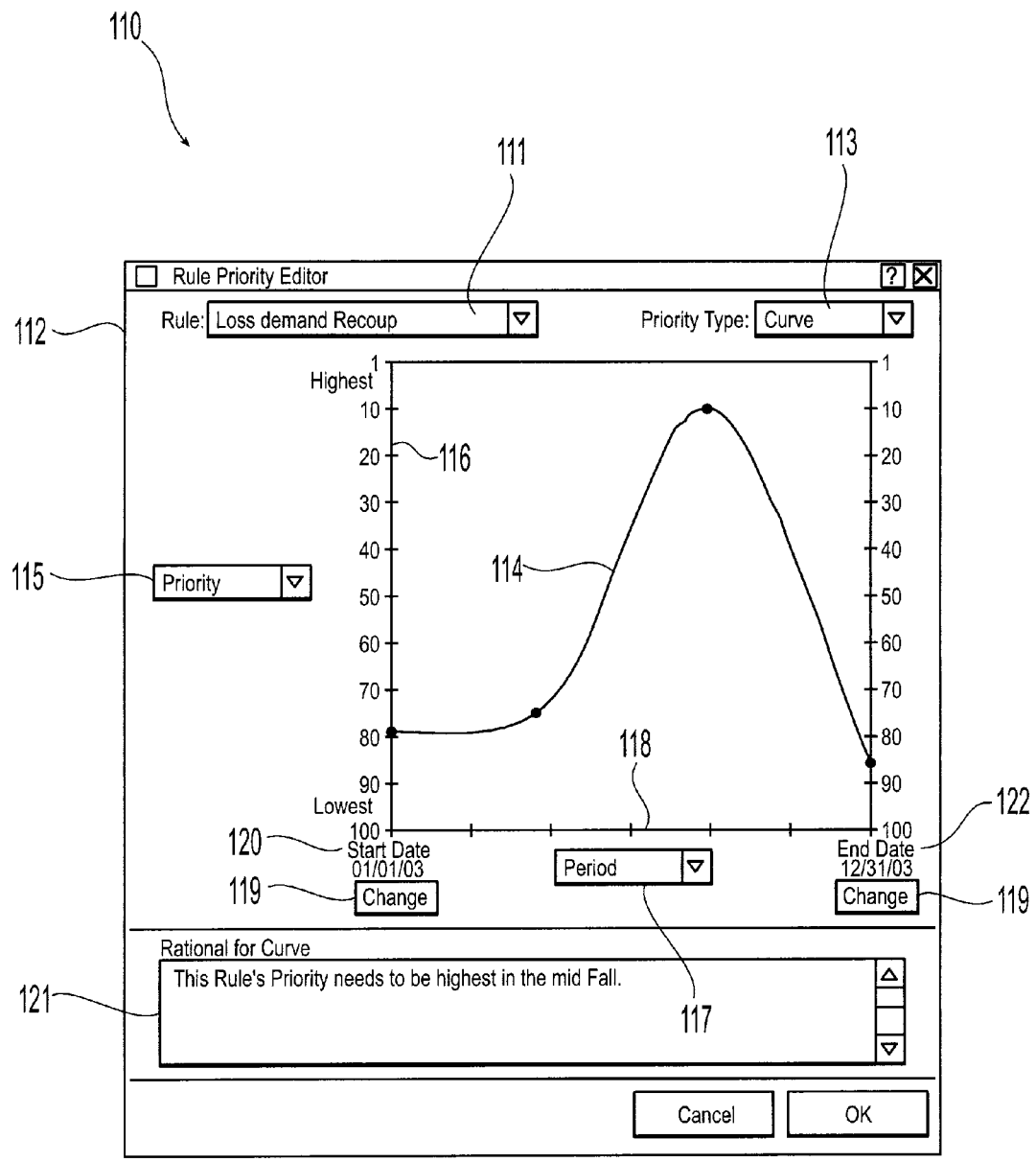
FIG. 1 is a representation of an embodiment of a graphic interface for modifying the priorities of rules in a rule set in accordance with the present invention.

As illustrated in FIG. 1, an exemplary embodiment of a graphical environment priority editor 110 for illustrating and modifying rule priorities use in accordance with the present invention is illustrated. As illustrated, the graphical environment is a GUI that includes a rule priority editor window 112. The editor window 112 includes a graphical representation 114 of the function curve that expresses the fluctuation of priority with respect to one of more variables. Any graphical representation, for example a three-dimensional (3D) bar graph, can be used. As illustrated the graphical representation 114 is a two-dimensional (2D) line graph having a vertical axis 116 representing the priority associated with the rule and a horizontal axis 118 representing at least one second variable over which the priority varies. As illustrated, the second variable is time, and the horizontal axis 118 includes a start time 120, i.e. Start Date, and end time 122, i.e. End Date, for the application of the rule, as illustrated Loss demand Recoup. However, any two variables can be plotted, not just time and priority.

The GUI facilitates modification of rules being edited and the editing parameters through mechanisms available in such interfaces. As illustrated, a rule box 111 is provided to enter or to select the rule that is to be displayed, and the type of priority to be displayed, i.e. the curve 114, can be defined using a priority type box 113. Although the rules and priority types can be user-defined and entered, preferably, both are selected from pre-determined menus associated with the respective boxes. A similar selection method is provided to define the axes of the priority graph. A y-axis selection box 115 and an x-axis selection box 117 are provided. In addition, change buttons 119 are provided for defining the extent of the x-axis variable over which the graph is to be displayed. Additional instructions and information is provided in a text box 121. All of the boxes are coordinated, and the setting of one box can auto-populate either the selections or default values of other boxes. For example, in one embodiment selection of a rule will auto-populate the contents of the text box 121 and the choices associated with the priority type box 113.

The priority values in the curve 114 can be represented discretely as a series of distinct values or can be represented as a smooth, continuous curve. The GUI provides for manual manipulation of the curve 114, including both discrete values in the curve and the continuous shape of the curve. As initially displayed, the curve 114 can be defined by an initial function, and after the curve 114 is adjusted, the rule priority editor generates a new function to fit the curve 114 in its modified form. This new function is associated with the selected rule as its priority function and is assigned a unique name to distinguish it from the initial priority function and any other subsequent priority functions. Suitable methods for outputting the function describing the curve include using curve fitting algorithms or other user-defined tools that transform the output from the GUI to a function of variables associated with the x and y-axes, e.g. time and priority.

As illustrated, the rule priority editor 110 modifies one rule at a time. Alternatively, the rule priority editor 110 can display and modify a plurality of rules within a given rule set simultaneously. Simultaneous editing assists the business rule author in visualizing the interrelationship of the priorities among the rules in the rule set, because when the priority function of one rule in a rule set changes, the relative priorities of the other rules in the rule set are affected. In order to compensate for the effect that changing one rule has on other rules within the same data set, an analysis and validation check on all of the rules in the rule set is performed.

Figure 2:
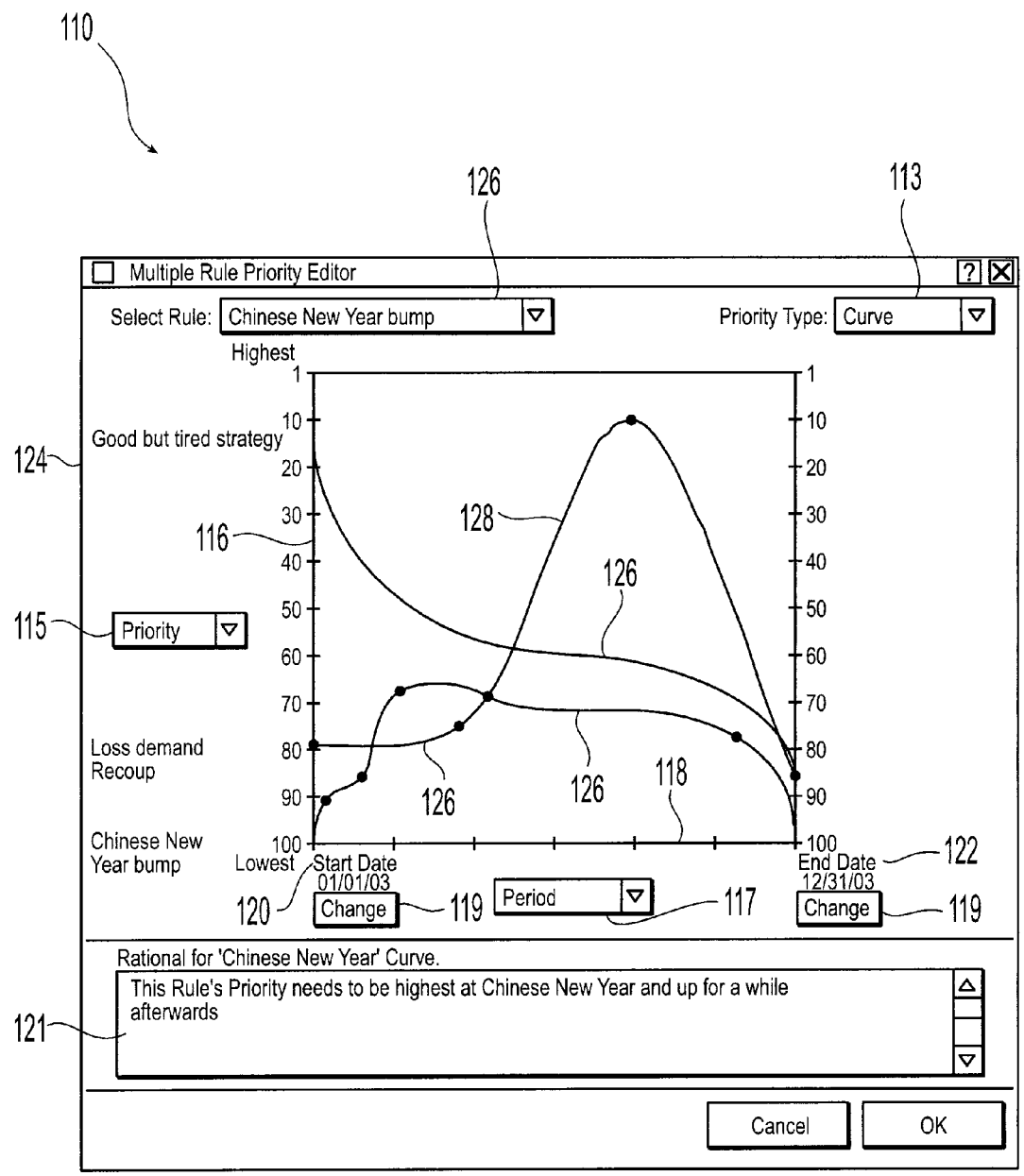
FIG. 2 is a representation of another embodiment of the graphical interface for modifying priorities.

Referring to FIG. 2, an exemplary embodiment of a rule priority editor 110 GUI containing a multiple rule priority editor window 124 is illustrated. The multiple rule priority editor window 124 simultaneously displays two or more priority graphs for rules from a given rule set. In one embodiment all of the rules in a given rule set are displayed. Alternatively, only a user-defined subset of rules from the rule set is displayed. In one embodiment, a group of rules in a rule set are selected, and one or more of the priority curves over a common variable are overlayed on a single graph. The multiple rule editor window 124 generally contains the same selection boxes as the single rule editor window 112. The relative priority curves 126 for two or more rules are displayed graphically in accordance with the selected priority type 113. The business rule author can view and verify the priority settings and can also use the multiple rule priority editor to modify one or more of the displayed priorities. In one embodiment, the multiple rule editor window 124 contains a rule selection box 126 to select a current rule curve 128 that is active for manual manipulation within the window 124.

Although illustrated for the manipulation of a single rule curve from the plurality of displayed rule curves, multiple rules may also be selected and a manipulation applied simultaneously to those rules. For example, the priorities associated with a set of rules can be manipulated simultaneously, equally and in concert, leaving the other non-selected rule priority curves unchanged.

The present invention is also directed to methods and systems for authoring business rules and establishing priority among a plurality of rules within a given rule set. In one embodiment, a graphical interface is used to create at least one rule for inclusion in a rule set containing a plurality of rules. The GUI is capable of illustrating the logical syntax of the rule and the precedence among operators and operands in the rule in an environment that is intuitive and conceptual for users, i.e. business users. The rule author uses various mechanisms or priority schemes to indicate priority among the numerous rules in the rule set. Suitable priority schemes include, but are not limited to an integer numbering system, priority functions generated by a rule priority editor, order lists and combinations thereof.

An integer numbering system specifies an integer value to be associated with each rule in the rule set. The rules are then applied or executed in accordance with their integer values, i.e. in order of increasing or decreasing integer value. Priority functions can be generated by the single rule priority editor of the multiple rule priority editor. For example, if the rule priority editor outputs a function called the holiday discount priority that states that if a customer buys more than 100 then a 20% discount is offered, the rule author applies this priority function to the rule. In one embodiment, a given rule set contains both the rules and the priorities or priority functions associated with these rules.

In one embodiment, the present invention includes a rule engine. The rule engine acts as a rule execution mechanism, determining when a particular rule set is needed and invoking the execution of the rules contained within the rule set in accordance with the associated priorities. In order to execute the rules within a selected rule set, the rule engine examines the priority of each rule. In one embodiment, the rule engine uses the specified rule priority function to compute a current priority value for the rule associated with the rule priority function. Preferably, the rule engine computes current priority values for all rules contained within the rule set. The rule engine associates the computed priority value with the rule internally and, if necessary, validates and resolves priority conflicts among the rules. Once all of the priorities are established and any conflicts are resolved, the rule engine executes all the rules in order according to their associated priorities.

Priority conflicts among the rules arise when more than one rule has the same current priority. In one embodiment, sub-priorities are specified for the rules. These sub-priorities specify additional factors to be used to determine priority and in particular can provide for a priority determination among any two rules in a rule set. Additional mechanisms to handle multiple rules having the same priority include using the slope values of the priority function curves at a given point to determine which rule has sub-priority, using a stacking box mechanism to change the sub-priority if more than one rule has the same priority due to overlapping function curves and the default sub-priority result is not desired and combinations thereof.

An exemplary embodiment of a system in accordance with the present invention includes a rule author for constructing complex rule sets containing a plurality of rules, each rule preferably having an associated priority. The rule author is provided a user-friendly interface that facilitates the construction of complex expressions of rules and the associated priorities. Methods and systems in accordance with exemplary embodiments of the present invention also provide for a user-friendly, intuitive, graphical environment for authoring business rules. In one embodiment, the graphical environment includes nested boxes. The nested boxes provide the priority or precedence indicated by the parenthesis and mathematical operators in this expression. In one embodiment, construction of the nested boxes is conducted in a graphical computer environment using input and display methods known and available in the art.

Figure 3:
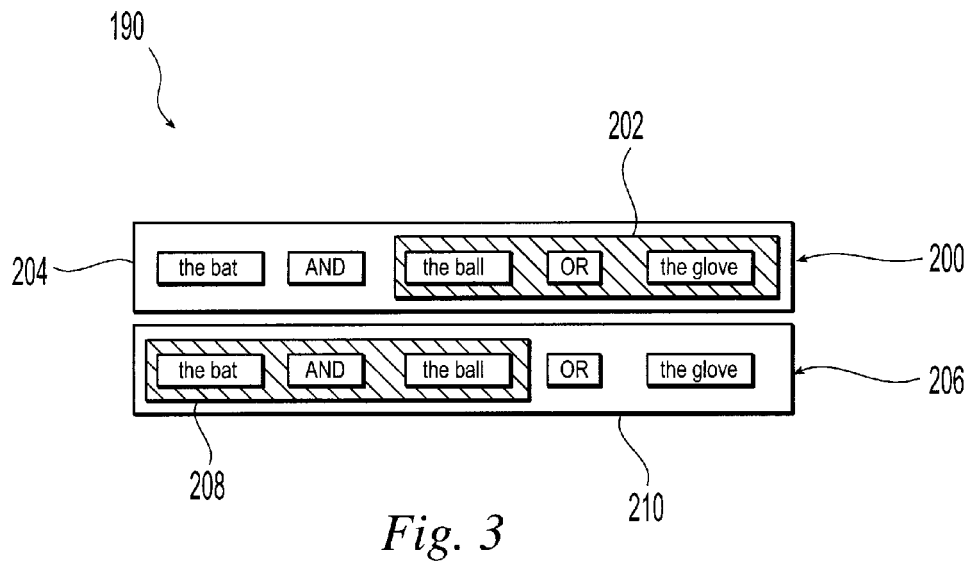
FIG. 3 is a representation of an embodiment of a graphical interface for authoring rules in accordance with the present invention.

Referring to FIG. 3, an embodiment of a graphical rule author 190 is illustrated. As illustrated, the graphical rule interface 190 utilizes nested boxes. As illustrated, the authoring system 190 contains the two independent nested boxes 200, 206, although any number and arrangement of nested boxes can be used depending on the type, number and complexity of the arguments and conditions associated with the rule. In the first nesting of boxes 200, a first inner box 202 illustrates the choice of either the ball or the glove. This first inner box 202 is nested in a first outer box 204 that provides for the addition of the bat to the selection between the ball and the glove. The nesting indicates that the selection between the ball and glove is made first followed by the addition of the bat. In the second nesting of boxes 206, a second inner box 208 is provided for the selection of both the bat and the ball. The second outer box 210 provides for the selection of either the bat and the ball or just the glove. Therefore, this nesting indicates that the selection is between either the glove alone or a combination of the bat and the ball. The arrangement of inner or outer boxes can be set or can be modified by the rule author. In addition, the arguments within the boxes can be entered by the rule author.

Figure 4:
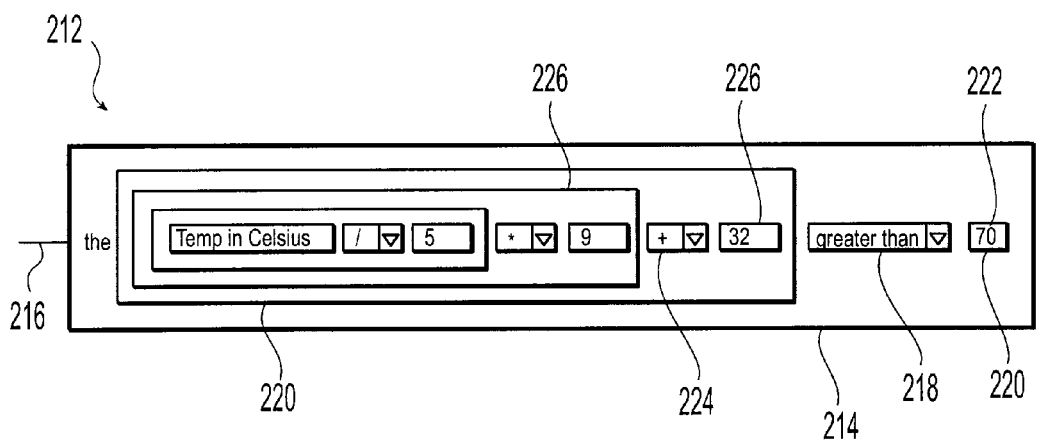
FIG. 4 is a representation of another embodiment of a graphical interface for authoring rules in accordance with the present invention.

Referring to FIG. 4, another embodiment of a graphical rule author environment 212 in accordance with the present invention is illustrated. This embodiment also utilizes a nested box structure to facilitate the entry and arrangement of arguments and conditions in accordance with the desired hierarchy or precedence. This embodiment includes expandable lists of entries and modifiable box nestings to assist the author in creating the desired rules. Initially, the rule author is presented with a single box 214. In one embodiment, the single box 214 is a stand-alone box. Alternatively, the single box 214 contains a connection 216 or relationship to a larger hierarchy. In one embodiment, the single box 214 contains at least one expandable menu 218 to facilitate the entry of operators or operands. The user either selects an operator or operand, for example an atomic value, from the list of operators and operands in the drop down menu 218 or inputs another operator or operand. In one embodiment, the single box 214 contains a connection to a large hierarchy, then the desired entry in the box could be a value, i.e. operand, to be used in that large hierarchy. If an operand is selected or entered, the single box 214 is complete.

In another embodiment, the single box 214 is a stand-alone box, and the rule author uses this box to construct a new rule for the rule set. The rule author selects an operator, for example =, > etc., from the expandable list associated with the original single box 214. Since the operator acts upon operands, the original single box 214 expands into a box containing 3 boxes, the original menu box 218 containing the selected operator and two new boxes 220 having associated expandable lists of selections. By continuing to display the original menu box 218 throughout the authoring process, the hierarchy and syntax of the rule can easily be modified at any time during the authoring process.

Operators and operands are selected for the two new menu boxes 220, and for any subsequent menu box, using the same methods as for the original menu box 218. As illustrated, an operand, e.g. the number 70, is selected for a first one of the new menu boxes 222. An operator, e.g. "+", is selected for the second one of the menus 224. Entry of an operator again results in an expansion of the associated new menu box 200 and the creation of three boxes, a box for the second one of the menus 224 and two subsequent menu boxes 226. All three of these boxes are nested within the associated new menu box and the original single box 214. This process of selection of operands and operators in drop down menu boxes is continued, with nesting, until only operands are entered into both of the drop down menu boxes. As illustrated, operands and operators are entered into the drop down menu boxes corresponding to the expression (((TempInCelcius/5)*9)+32)>70. Additional visual indication of the priorities can be provided by the use of distinguishing colors among the plurality of nested boxes.

In addition to providing a simple blank box for use in constructing the desired expression, the user is provided a box that is pre-configured into a structure appropriate to a given task. In one embodiment, the box initially contains three sub-boxes, a first operand box, an operator box and a second operand box. After the user selects or enters an operator into the operator box, the first and second operand boxes are auto-populated with appropriate values. Alternatively, the values in the first and second operand boxes are constrained to the appropriate data types or data value to assist the user in completing the expression.

Figure 5:
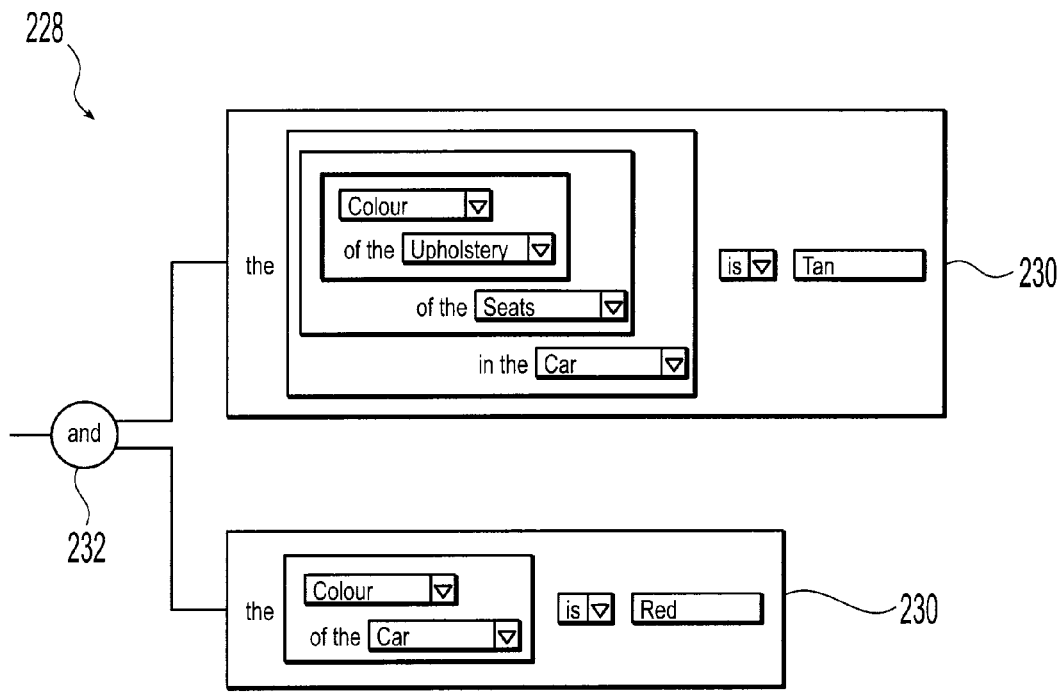
FIG. 5 is a representation of another embodiment of a graphical interface for authoring rules in accordance with the present invention.

In one embodiment, pre-configured nested boxes and constrained data are used for the creation of more complex rule expressions. Containment relationships are common concepts in both programming and business rules. For example, the concept of containment is widely understood as a programming concept in object oriented programming (OOP). In one embodiment as illustrated, for example, in FIG. 5, the rule author is provided with a pre-configured arrangement of boxes 228 arranged in accordance with a pre-defined set of rules or tasks. These pre-configured arrangements 228 allow business users to visualize a logical structure and to relate this structure naturally to common business problems and entities. The pre-configured arrangement includes a plurality of boxes 230.

In one embodiment, one or more of the plurality of boxes 230 contains a single initial drop down menu. Alternatively, one or more of the plurality of boxes contains a pre-configured multi-level nesting of boxes. In yet another embodiment, each individual conditional clause, which has a Boolean output value, is represented by an independent box having either a false or true value. Regardless of the arrangement of each box 230, containment is applied to the drop down menus or expandable lists in the boxes to facilitate expression construction. That is the values of the operands or operators available for selection are limited or contained. In one embodiment, colored boxes or keys are used to further illustrate the concept of containment. In one embodiment, multiple boxes 230 are linked together via pre-defined connective operators 232. The pre-defined connective operators 232 use classical logical operations to form complex conditional clauses among the plurality of boxes 230.

In hierarchical information systems or expressions, the removal, addition, or modification of a node or part of the expression can affect the overall syntactic structure of the hierarchy. For example, inserting an element arbitrarily may cause the entire syntactic structure to be re-arranged and a new hierarchy to be formed. Therefore, systems and methods in accordance with exemplary embodiments of the present invention provide sufficient feedback to the rule author to communicate the effect of additions, subtractions and modifications on the overall hierarchy.

Figure 6:
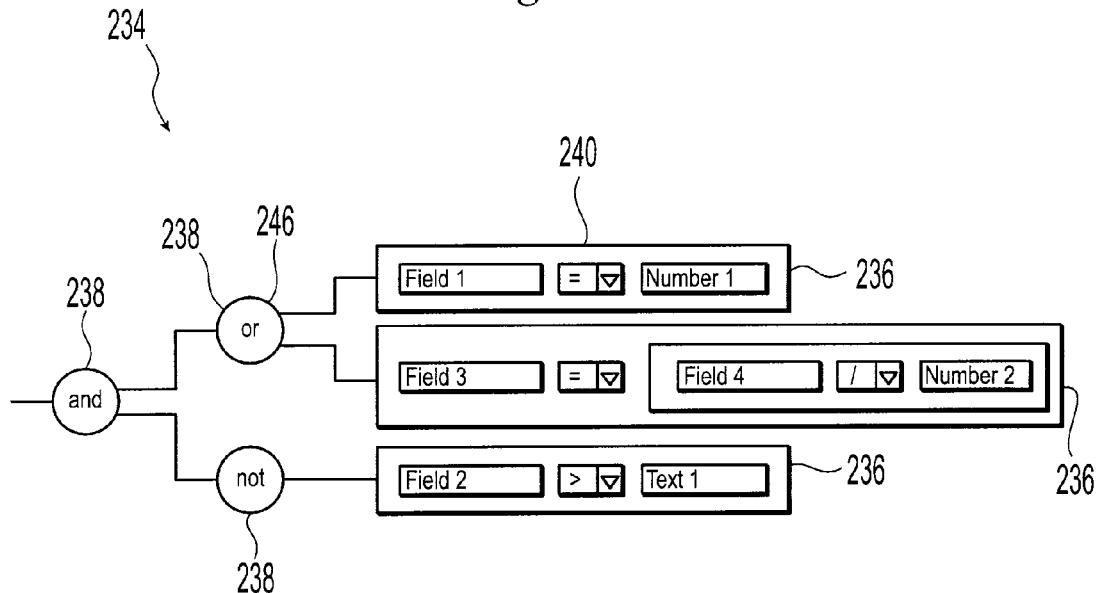
FIG. 6 is a representation of an embodiment of a nested box representation in an initial arrangement.

Referring to FIG. 6, in one embodiment, a complex conditional clause 234 contains a plurality of conditional clauses 236 linked together using one or more logical operators 238. Each one of the conditional clauses 236 is represented by an independent box arranged in accordance with exemplary embodiments of the present invention as described herein. Although the conditional clauses 236 can be linked together based upon a pre-determined logical structure and fixed within that pre-defined structure, preferably the conditional clauses within the independent boxes are arbitrarily linked together. Each independent box representing a distinct conditional clause can be manipulated in a graphical environment within the complex conditional clause. The independent boxes can be manipulated separately or in groupings of boxes. In one embodiment, an independent box is moved from a first location 240 (FIG. 6) within the initial complex conditional clause 234 to a second location 242 (FIG. 7) within the modified complex conditional clause 244. Suitable methods for moving the independent boxes include any method available for moving objects within the graphical environment, including, for example, techniques known and available in the art such as clicking and dragging the box within the graphical environment. Additional available methods include, but are not limited to, cutting and pasting the independent boxes, pasting the independent boxes to a clipboard, deleting the independent boxes, copying the independent boxes and combinations thereof.

Figure 7:
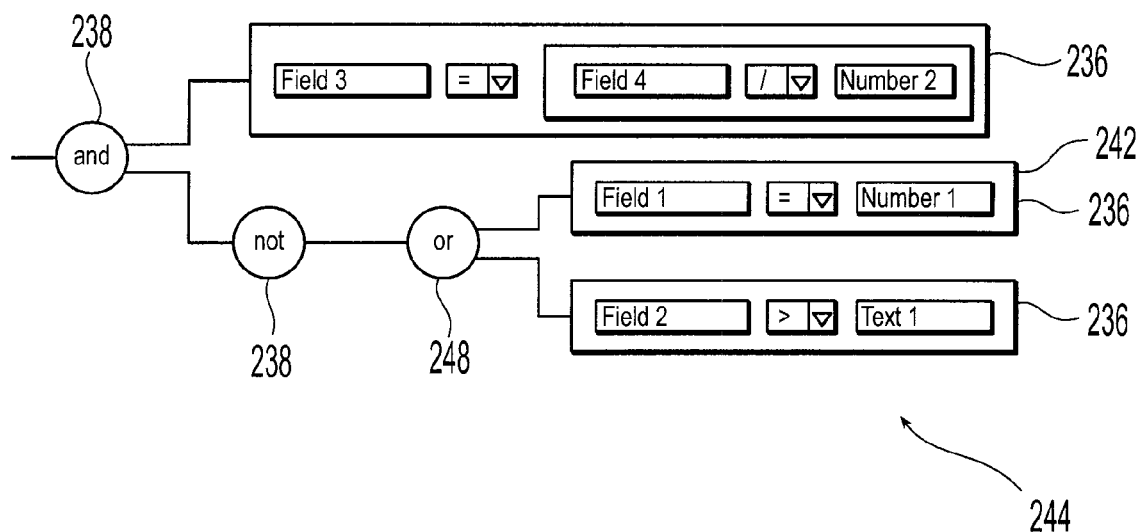
FIG. 7 is a representation of the nested boxes and logical operators used in FIG. 6 re-arranged to result in a different logical meaning.

After the independent box is moved, the system interactively analyzes the overall logical structure of the modified complex clause, and the hierarchical structure is rearranged in accordance with these changes. Rearranging of the hierarchical structure includes removing logical operators that are no longer required 246 (FIG. 6) and adding new logical operators 248 (FIG. 7). The new logical operators 248 can be automatically selected by the system using, for example, pre-configured parameters or can be user-defined using, for example, drop down menus. The changes are immediately displayed in the graphical environment. For purposes of clarity, the additions to the logical structures can be displayed in different colors or using bold-face type, and the deletions can be illustrated, if desired, using grayed-out text or dashed lines. Therefore, the user can easily track changes and modifications to the structure of the complex clause.

Overall, exemplary methods in accordance with the present invention use interactive, expanding, nested boxes to support user interaction and feedback, to facilitate user understanding of logical relationships within the complex logical structure and to illustrate the logical and hierarchical implications of changes to complex expressions. The nested boxes can be color-keyed. In one embodiment, the boxes containing the operators and operands, as well as the box borders, are adequately sized to provide sufficient area to easily accommodate a cursor associated with a pointing device, a pointing device, or a user finger for a touch screen graphical environment. Additional feedback can be provided to the user when the pointing device is within the area of a box by changing the icon associated with the cursor or changing the appearance of the box. Highlighting or changing the color of the box on selection, or on movement over the box, gives the user unambiguous feedback regarding what is inside. The graphical indicators for box or expression selection can be applied to single boxes, multiple boxes, single expressions, operators and operands. These graphical interface clues support user interaction for functions including copying, pasting and moving expressions.

In one embodiment, user feedback is provided on an associated operator basis. For example, logical operators can be removed from the nested expression boxes or can be copied to a separate location within the graphical environment. These operators are linked to the boxes from which they were pulled or from which they were copied. Therefore, by selecting one of these operators, all of the boxes or elements, for example operands and expressions, within the boxes upon which that operator acts are highlighted. Any suitable methods for selecting the operators and visually highlighting the associated elements within the graphical environment can be used. This embodiment provides the user or author of the complex expression an easy method to highlight the elements upon which that operator acts, for example, for purposes of debugging the complex expression.

The systems and methods in accordance with exemplary embodiments of the present invention provide the flexibility to create arbitrarily complex structures while maintaining simplicity through the separation of component structures. These component structures are created using a variety of methods including constructing the entire logical structure sequentially from bottom-up and building an overall logical structure by manipulating, i.e. inserting, copying, moving and deleting, a plurality of component structures within a graphical environment. Arrangement of the complex structure in or assembly of the complex structure from a plurality of component structures enables a readout or play mode, either textual or auditory, to illustrate or read back the resulting overall logical structure with visual highlighting as necessary as the logical sequence of the expression is executed.

In one embodiment, additional assistance is provided for authoring expressions by providing coordinated color schemes between operators, operands and other expressions and the boxes into which they are entered. When entering information, such as the parameters of a function, the information can be provided within the graphical environment that matches the signature of the underlying expression. For example, a function for providing customer discounts contains two arguments, customer and customer status. The function returns an integer. A color-keyed system is used to guide the user to enter the correct information, with the color of the box matching the type of the parameters entered. This enables the user to enter the correct type information without actually knowing the type system of the underlying programming language.

The present invention is also directed to a computer readable medium containing a computer executable code that when read by a computer causes the computer to perform a method for authoring and editing business rules and for establishing and modifying priorities among a plurality of rules in a rule set using a graphical environment in accordance with the present invention and to the computer executable code itself. The computer executable code can be stored on any suitable storage medium or database, including databases in communication with and accessible by any component used in accordance with the present invention, and can be executed on any suitable hardware platform as are known and available in the art.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for authoring rule sets, the method comprising:
   using a graphical interface to create at least one rule for inclusion in a rule set containing a plurality of rules, the graphical interface capable of illustrating logical syntax and precedence rules among operators and operands in the rule;
   displaying a single graph comprising a plurality of curves, each curve representing a priority function associated with one of the rules; and
   manually manipulating one or more of the curves within the single graph to change the associated priority function.

2. The method of claim 1, wherein the step of using the graphical interface comprises using nested boxes to illustrate the logical syntax and precedence rules.

3. The method of claim 2, wherein the nested boxes comprise expandable boxes.

4. The method of claim 2, wherein the step of using nested boxes comprises using color-keyed nested boxes.

5. The method of claim 2, wherein the step of using the graphical interface comprises providing at least one list of pre-defined operators and operands.

6. The method of claim 1, further comprising providing a plurality of reusable blocks comprising pre-defined logical expressions.

7. The method of claim 6, further comprising manipulating the plurality of reusable blocks within the graphical interface to create the desired rule.

8. The method of claim 1, further comprising providing feedback regarding the interrelation of operators and operands in the rule during creation of the rule.

9. The method of claim 1, further comprising associating a priority with each rule in the rule set.

10. The method of claim 9, further comprising modifying the priority associated with at least one rule.

11. The method of claim 10, wherein the step of displaying the single graph comprises displaying a graphical representation of the associated priority versus a second variable.

12. The method of claim 11, further comprising generating an updated priority for association with the rule based upon the manipulated curve.

13. The method of claim 11, wherein the step of displaying a graphical representation comprises displaying a two-dimensional graphical representation of the associated priority versus the second variable.

14. The method of claim 1, further comprising generating an updated priority function for each manipulated curve.

15. A method for authoring rule sets, the method comprising:
   modifying a priority associated with at least one rule in the rule set using a graphical environment by displaying a single graph comprising a plurality of curves, each curve representing a priority function associated with one of the rules in the rule set; and manually manipulating one of the curves within the single graph to change the associated priority function.

16. The method of claim 15, wherein the step of displaying the single graph comprises displaying a graphical representation of the associated priority versus a second variable.

17. The method of claim 16, further comprising generating an updated priority for association with the rule based upon the manipulated curve.

18. The method of claim 17, wherein the step of displaying a graphical representation comprises displaying a two-dimensional graphical representation of the associated priority versus the second variable.

19. The method of claim 15, further comprising generating an updated priority function for each manipulated curve.

20. A method for authoring rule sets, the method comprising:
   using a graphical interface to create a plurality of distinct rules for inclusion in a rule set containing a plurality of rules, the graphical user interface capable of illustrating logical syntax and precedence among operators and operands in the rule;
   associating a priority with each rule in the rule set; and
   displaying in graphical representation a single graph comprising a plurality of curves, each curve representing the associated priority versus a second variable for all rules in the rule set simultaneously; and
   manually manipulating one or more of the curves within the graphical representation to change the associated priority versus the second variable.

21. A computer readable medium containing a computer executable code that when read by a computer causes the computer to perform a method for authoring rule sets, the method comprising:
   using a graphical interface to create at least one rule for inclusion in a rule set containing a plurality of rules, the graphical interface capable of illustrating logical syntax and precedence rules among operators and operands in the rule;

displaying a single graph comprising a plurality of curves, each curve representing a priority function associated with one of the rules; and manually manipulating one or more of the curves within the single graph to change the associated priority function.

22. The computer readable medium of claim 21, wherein the step of using the graphical interface comprises using nested boxes to illustrate the logical syntax and precedence rules.

23. The computer readable medium of claim 22, wherein the step of using the graphical interface comprises providing at least one list of pre-defined operators and operands.

24. The computer readable medium of claim 21, further comprising providing a plurality of reusable blocks comprising pre-defined logical expressions and manipulating the plurality of reusable blocks within the graphical interface to create the desired rule.

25. The computer readable medium of claim 21, further comprising providing feedback regarding the interrelation of operators and operands in the rule during creation of the rule.

26. The computer readable medium of claim 21, further comprising associating a priority with each rule in the rule set and modifying the priority associated with at least one rule.

27. The computer readable medium of claim 21, further comprising generating an updated priority for association with each rule based upon the manipulated graphical representation.

28. The computer readable medium of claim 21, wherein the step of displaying a graphical representation comprises displaying a two-dimensional graphical representation of the associated priority versus the second variable.

* * * * *